March 28, 1939.   F. H. REDFERN   2,152,281
ARRANGEMENT OF DOORS ON MOTOR VEHICLES
Filed Dec. 28, 1936
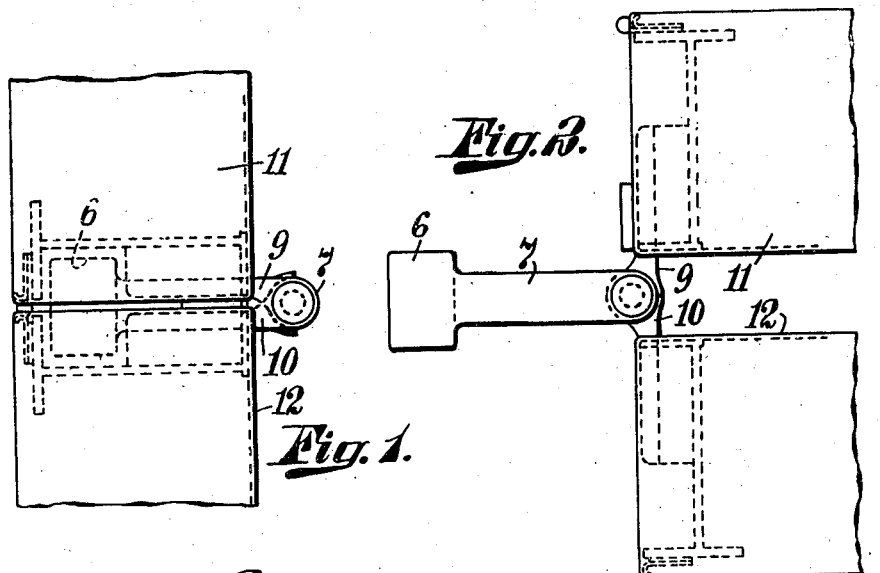
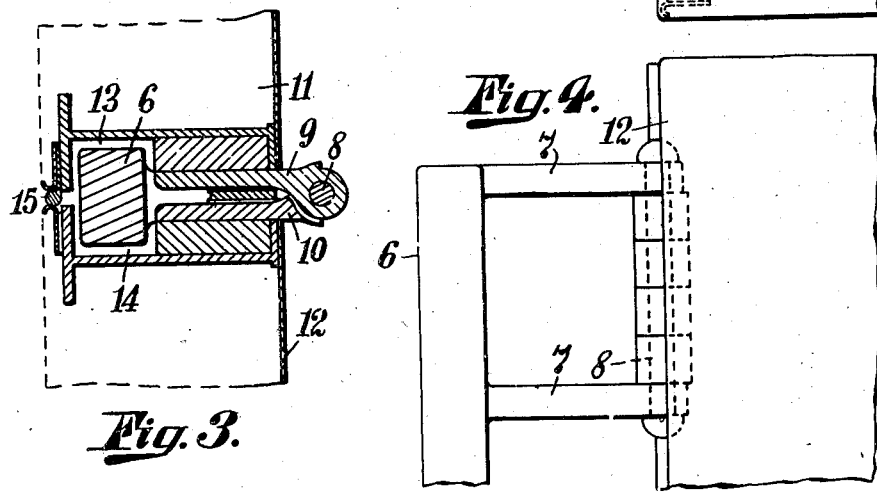
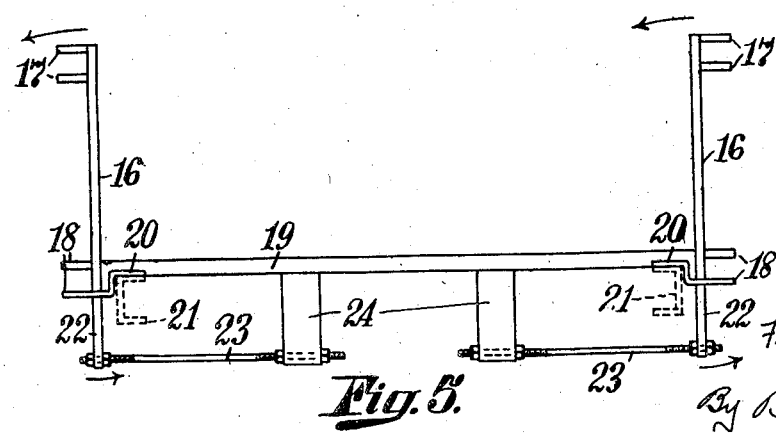
Inventor
Francis Henry
Redfern
By Bisinger, Atty.

Patented Mar. 28, 1939

2,152,281

UNITED STATES PATENT OFFICE 2,152,281

ARRANGEMENT OF DOORS ON MOTOR VEHICLES

Francis Henry Redfern, Folkestone, England

Application December 28, 1936, Serial No. 118,016
In Great Britain January 15, 1936

2 Claims. (Cl. 296—44)

This invention relates to the mounting of doors on motor vehicles and is particularly concerned with the mounting of a pair of such doors from a common support.

It is usual practice to provide a pair of doors at each side of a motor vehicle, the doors of each pair being separated by a pillar which, in the case of a saloon body with a fixed or movable head, extends generally up to the said head. Now the presence of such a pillar is objectionable and the principal object of the present invention is to provide an arrangement of simple and strong construction for supporting a pair of doors in such manner that they can abut against one another directly, thus avoiding the necessity for a pillar placed between the doors in such manner as to separate them one from the other.

The present invention contemplates an arrangement of doors on a motor vehicle wherein a pair of doors is hinged to a pillar mounted, at or towards its lower end only, upon the chassis or other suitable part of the vehicle and in which the adjoining edges of the doors that close upon the pillar have recesses adapted to accommodate said pillar when the doors are in closed position and serve to conceal said pillar both from the inside and outside of the vehicle.

Preferably, the pillar extends to a point somewhat below the upper edges of the doors and carries, at its extremity, the uppermost hinge for the doors. The said pillar is of relatively small cross section and is formed of any suitable material, preferably metal of sufficient strength to give an adequate support for the two doors.

The pillar itself may be mounted directly upon the chassis or other suitable portion of the vehicle in a permanently rigid manner or if desired the pillar may be so arranged as to be moved transversely, longitudinally, or both transversely and longitudinally of the vehicle for the purpose of adjustment. For example the pillar may be extended below the lower level of the doors and such extension have associated therewith anchoring means of an adjustable nature whereby desired adjusting movements may be imparted to the pillar.

In order that the invention may be more fully understood a preferred practical embodiment thereof will now be more particularly described with reference to the accompanying drawing wherein:—

Fig. 1 is a plan view of the hinged portion of a door mounting constructed and arranged according to the invention.

Fig. 2 is a corresponding plan view but with the doors in their opened position.

Fig. 3 is a sectional plan through the hinged portion shown in Fig. 1.

Fig. 4 is an elevational view of Fig. 2, and

Fig. 5 is a somewhat diagrammatic view showing a preferred embodiment of a subsidiary feature of the invention relating to the adjustment of the pillars for the doors.

Referring to Figs. 1-4 the pillar 6 is of solid rectangular section and is adapted to be supported at its lower end by the chassis or other suitable portion of the motor vehicle. The pillar 6 is provided at its upper end with brackets 7 which may be formed integrally with said pillar by casting or otherwise, or be fixed to said pillar for example by welding. Between a pair of these brackets 7 there is arranged a hinge pin 8 upon which the two parts 9 and 10 respectively of a hinge are mounted.

The portions 9 and 10 of the hinge have secured thereto doors 11 and 12 respectively.

A similar pair of brackets to those indicated at 7 is provided at the lower end of the pillar and serve to carry a hinge connected to the lower portion of the doors 11 and 12.

The two doors 11 and 12, which are thus hingedly supported upon the pillar 6 are provided along their closing edges with vertically extending recesses 13, 14 respectively. These recesses are formed by channelled metal elements constituting the edge portion of the door structure, such elements being of an integral nature or built-up from a number of pieces or strips of metal in order to define a channel-shaped recess. It will be evident upon reference to Fig. 3 of the accompanying drawing that when the doors 11 and 12 are in closed position the pillar 6 is located partially in one recess and partially in the other and that said pillar is concealed from the outside of the vehicle.

As the pillar 6 does not extend to the full height of the doors, the channelled portions of the closing edges of the doors are discontinued immediately above the upper end of the pillar and, if desired, co-operating elements may be provided on the two doors at the parts thereof which are located above the pillar, which elements prevent the entry of rain or draughts through the upper part of the doors. The said co-operating elements may comprise a projecting strip or blade carried by one of the doors and seating against a co-operating recess in the other door, with the interposition of a suitable packing material.

In order to prevent the entry of draughts to the inside of the vehicle, the closing edge of the door 11 coming towards the inside of the vehicle carries a tubular draught-seal strip 15 formed from rubber or other suitable material and adapted to seat against a co-operative part carried by the door 14 and thus prevents the entry of air currents through the space between the said doors.

The doors may be provided, in the usual way, with means for supporting glass or other windows which may be moved up and down and which may be adapted, by suitable means to be brought into edgewise engagement one with the other when said windows are raised fully, or detachable screens are provided.

Although in the case particularly described the hinges for the doors are visible from the outside of the vehicle it is possible if desired to arrange said hinges on the inside of the vehicle.

Although it is possible to assemble a piller or pillars upon the chassis or other part of a motor vehicle in a permanently rigid manner such that it is possible to provide for the satisfactory opening and closing of the doors at all times, it has been found that it is advantageous so to arrange such pillars that they can be adjusted either collectively or independently and either transversely or longitudinally or both transversely and longitudinally of the vehicle. Such an adjustable arrangement of pillars can be provided by forming the pillars with an extension below the level of the bottom of the doors carried thereby, said extension being subject to the connection of an anchoring means which may be fixedly attached to the downward extension and may in itself be adjustable, or the connection of the anchoring means to the downward extension may be of an adjustable nature.

Thus, in the first instance, if the anchoring means is stressed transversely or longitudinally or both, the downward extension is pulled or pushed transversely or longitudinally and consequently it will have a desired adjusting effect on the pillar proper. In the second instance, by varying the anchorage, for example by variably positioning a nut or nuts on an anchorage tie or the like, in its relation to the downward extension of the pillar, the necessary adjustment is given to the pillar proper.

There is shown in Fig. 5 one particular method of arranging a pair of oppositely disposed pillars on the chassis of a vehicle so that their position may be adjusted transversely of said vehicle.

The pillars proper are indicated at 16 and are provided at their upper end with a pair of brackets 17 for hinges connected to a pair of doors as hereinbefore described with reference to Figs. 1–4.

Towards the lower end of the pillars 16 a further pair of brackets 18 is provided. These lower brackets are constituted by the opposite ends of a transverse bracing strut 19 which extends through an aperture provided in each of the pillars 16 and by a portion of a plate 20 which is adapted to be connected, by bolting or otherwise to the chassis of the vehicle, said chassis being indicated in dotted lines at 21. The brackets 18 are of course provided for carrying the hinge connected to the lower portion of a pair of doors in a manner herein previously described.

Each of the pillars 16 is provided with a downward extension 22 which comes below the level of the bottom of the doors associated with said pillars. The lower end of each of the extensions 22 is apertured to receive a transversely extending rod 23. The end of the rod 23 which passes through the extension 22 is screw threaded and provided with corresponding nuts whereby the point of connection between the rod and the pillar can be adjusted as required. The other end of the rod 23 extends through a bracket 24 which depends from the bracing strut 19. This end of the rod 23 is also screw threaded and provided with corresponding nuts to enable its position within the bracket 24 to be adjusted as desired.

It will be obvious that by the variable adjustment of the anchorage means constituted by the tie rod 23 and the adjustable nuts carried thereby, to vary the position (within previously ascertained limits) of the pillars 16, transversely of the vehicle.

The invention is not limited to the precise forms or details of construction described, as these may be varied to suit particular cases without departing from the scope of the appended claims.

What I claim and desire to secure by Letters Patent of the United States of America is:

1. An arrangement of doors on a motor vehicle comprising, on each side of the vehicle, a pillar fixed at its lower end to a suitable part of the base of the vehicle and free at its upper end, a pair of brackets at the upper end of the pillar integral therewith and a pair of brackets at the lower end of the pillar, a pair of doors each having, on the edge adapted to come adjacent said pillar and towards the upper end thereof, apertured hinge parts and each of said doors having, towards the lower end of the same edge, apertured hinge parts, the said hinge parts at the upper and lower ends of the doors co-operatively engaging with the pairs of brackets at the upper and lower parts of the pillar respectively, hinge pins between the said brackets and said hinge parts, channels in the said adjacent edges of the doors which carry the hinge parts to close upon the pillar to accommodate said pillar when the doors are in the closed position and serve to conceal said pillar both from the inside and the outside of the vehicle, said pillar being of less height than the doors, the channel portions of the doors being discontinued immediately above the upper end of the pillar to leave the door portions to come over and enclose said pillars from above, for the purposes set forth.

2. An arrangement of doors on a motor vehicle comprising, on each side of the vehicle, a pillar fixed at its lower end to a suitable part of the base of the vehicle and free at its upper end, a pair of brackets at the upper end of the pillar integral therewith and a pair of brackets at the lower end of the pillar, a pair of doors each having, on the edge adapted to come adjacent said pillar and towards the upper end thereof, apertured hinge parts and each of said doors having, towards the lower end of the same edge, apertured hinge parts, the said hinge parts at the upper and lower ends of the doors co-operatively engaging with the pairs of brackets at the upper and lower parts of the pillar respectively, hinge pins between the said brackets and the said hinge parts, channels in the said adjacent edges of the doors which carry the hinge parts to close upon the pillar to accommodate said pillar when the doors are in closed position and serve to conceal said pillar both from the inside and the outside of the vehicle, said pillar being of less height than the doors, the channel portions of the doors being discontinued immediately above the upper end of the pillar to leave the door portions to come over and enclose said pillars from above, downwardly projecting extensions of said pillar beyond their point of attachment to the base of the vehicle, and means connected to said downwardly extending portions and to a fixed part of the base, and constructed to impart an adjusting strain thereto, for the purposes set forth.

FRANCIS HENRY REDFERN.